(12) United States Patent
Ripple, Jr.

(10) Patent No.: US 8,608,145 B1
(45) Date of Patent: Dec. 17, 2013

(54) FLANGE CLAMP

(76) Inventor: Robert E. Ripple, Jr., Richmond, TX (US)

( * ) Notice: Subject to any disclaimer, the term of this patent is extended or adjusted under 35 U.S.C. 154(b) by 606 days.

(21) Appl. No.: 12/882,938

(22) Filed: Sep. 15, 2010

(51) Int. Cl.
*B23Q 3/00* (2006.01)
*F16L 3/08* (2006.01)
*F16L 3/00* (2006.01)

(52) U.S. Cl.
USPC ............. 269/287; 29/256; 248/74.1; 285/407

(58) Field of Classification Search
USPC ............. 269/287, 43; 29/256, 760, 828, 450; 248/500, 74.1, 62, 74.4; 285/407; 403/336
See application file for complete search history.

(56) References Cited

U.S. PATENT DOCUMENTS

| | | | | |
|---|---|---|---|---|
| 1,279,022 A * | 9/1918 | Scott | | 30/96 |
| 3,013,821 A * | 12/1961 | Bogan | | 285/407 |
| 3,487,534 A * | 1/1970 | Schustack | | 29/450 |
| 3,711,920 A * | 1/1973 | Simmons, Jr. | | 29/256 |
| 4,416,061 A * | 11/1983 | Aanerud et al. | | 29/828 |
| 4,530,478 A * | 7/1985 | McClellan | | 248/62 |
| 4,760,640 A * | 8/1988 | Lawrence | | 29/760 |
| 4,804,158 A * | 2/1989 | Collins et al. | | 248/74.4 |
| 4,824,066 A * | 4/1989 | Smith | | 248/500 |
| 4,825,543 A * | 5/1989 | Thalmann et al. | | 30/96 |
| 5,121,946 A * | 6/1992 | Jardine | | 285/15 |
| 5,605,357 A * | 2/1997 | Bird | | 285/15 |
| 6,031,972 A * | 2/2000 | Barker | | 392/478 |
| 6,244,138 B1 * | 6/2001 | Campbell | | 81/57.4 |
| 6,412,157 B1 * | 7/2002 | Gray | | 29/237 |
| 6,575,412 B2 * | 6/2003 | Klezath | | 248/58 |
| 7,325,776 B2 * | 2/2008 | Shibuya | | 248/62 |
| 7,861,983 B2 * | 1/2011 | Lange et al. | | 248/74.4 |
| 7,997,541 B2 * | 8/2011 | Pothanikat et al. | | 248/74.1 |
| 8,220,781 B2 * | 7/2012 | Gray | | 256/65.13 |
| 2002/0171013 A1 * | 11/2002 | Nicolia et al. | | 248/74.1 |
| 2005/0116123 A1 * | 6/2005 | Bailey et al. | | 248/74.1 |
| 2010/0257702 A1 * | 10/2010 | Fritskey et al. | | 24/20 R |

* cited by examiner

*Primary Examiner* — Alvin Grant
(74) *Attorney, Agent, or Firm* — Buskop Law Group, PC; Wendy Buskop

(57) ABSTRACT

A flange clamp also known as a quick release clamp, in a preferred embodiment, includes a first half clamp body and a second half clamp body; the first half has a first arc outer side and a first arc inner side with the inner side having a first arc first load bearing shoulder and a first arc second load bearing shoulder. The first arc having a curvature of about 175 degrees to about 350 degrees with a first space is formed between the load bearing shoulders and is adapted to fit about a flange.

18 Claims, 4 Drawing Sheets

FLANGE CLAMP

FIELD

The present embodiments generally relate to a flange clamp or a quick release clamp.

BACKGROUND

A need exists for a flange clamp or a quick release clamp that can secure about a flange, such as an API flange.

A further need exists for a flange clamp or a quick release clamp that can safely support a work platform, oil field equipment, or the like.

The present embodiments meet these needs.

BRIEF DESCRIPTION OF THE DRAWINGS

The detailed description will be better understood in conjunction with the accompanying drawings as follows.

Figure 1:
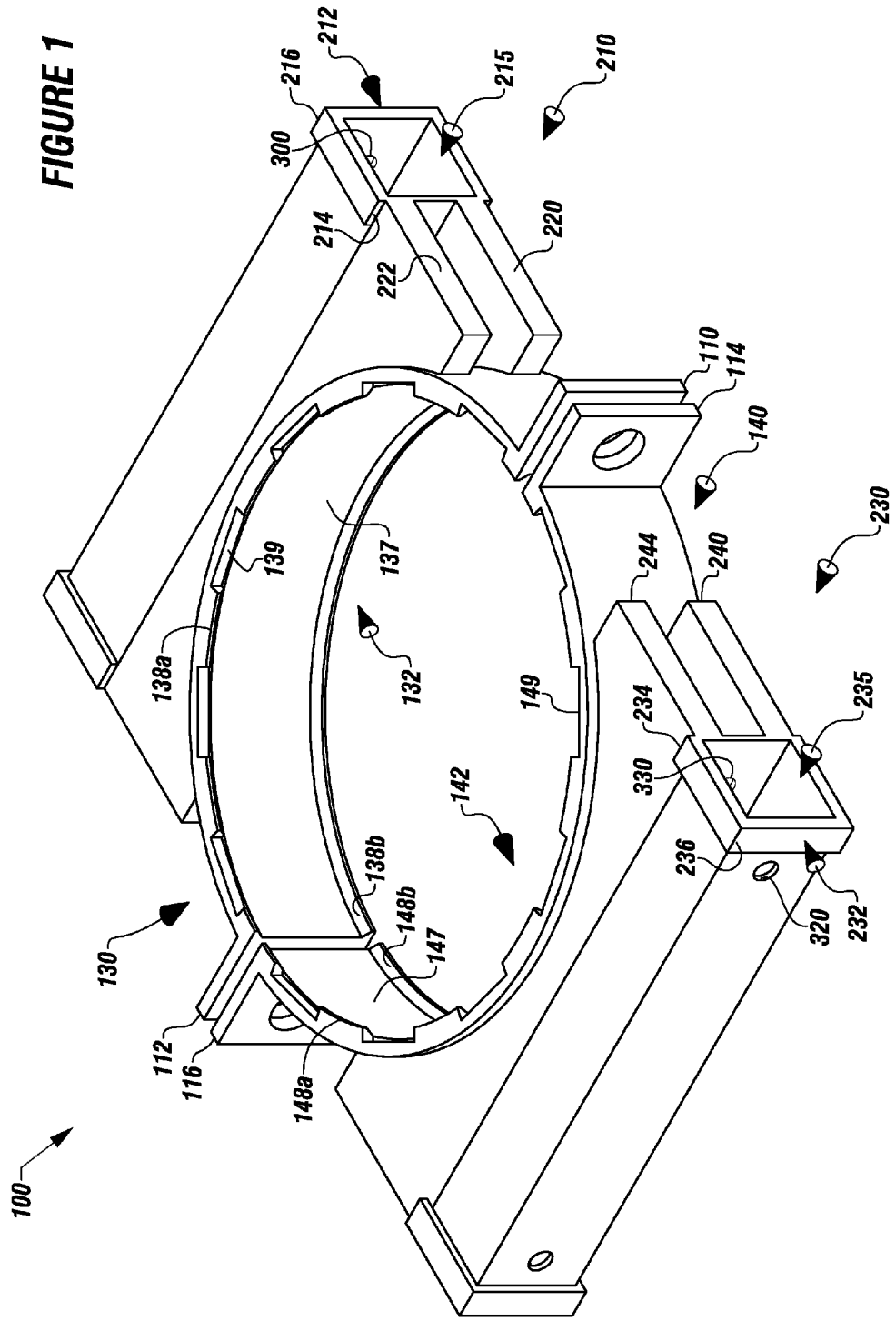
FIG. 1 depicts an isometric view of an illustrative flange clamp or a quick release clamp according to one or more embodiments.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

The present embodiments generally relate to a flange clamp or a quick release clamp.

In one or more embodiments the flange clamp or a quick release clamp can include a first half clamp body and a second half clamp body. A flange clamp can be referred to herein as a quick release clamp.

The first half clamp body can include a first arc. The first arc can have a first arc outer side and a first arc inner side. The first arc inner side can have a first arc first load bearing shoulder and a first arc second load bearing shoulder. The first arc can have a curvature from about 175 degrees to about 350 degrees.

A first space can be formed between the load bearing shoulders. The first space can be adapted to fit about a flange.

One or more of the load bearing shoulders can have one or more first cutouts formed therein. The first cutouts can have a half moon shape, an elliptical shape, a square shape, a rectangular shape, the like, or combinations thereof. For example, the first cutouts can be configured to ensure that there is not interference between a nut and the clamp.

A first half first connector can be disposed on one end of the first arc. The first half first connectors can be illustrative and can include a plate with a hole formed therethrough, a hole formed through a flange formed onto or connected to the end of the first arc, or combinations thereof.

A first half second connector can be disposed on the other end of the first arc opposite the first half first connector. The first half second connectors can be illustrative and can include a plate with a hole formed therethrough, a hole formed through a flange formed onto or connected to the end of the first arc, or combinations thereof.

The second half clamp body can include a second arc. The second arc can have a second arc outer side and a second arc inner side. The second arc can have a curvature from about 175 degrees to about 350 degrees.

The second arc inner side can have a second arc first load bearing shoulder and a second arc second load bearing shoulder. A second space, adapted to fit about the flange, can be formed between the load bearing shoulders.

A second cutout, which can be similar to any cutouts described herein, can be disposed on at least a portion of at least one of the second arc load bearing shoulders. For example, a plurality of cutouts can be disposed on the second arc first load bearing shoulder.

A second half first connector can be disposed on one end of the second arc, and a second half second connector can be disposed on the other end of the second arc opposite the second half first connector. The second half first connector and second half second connector can be substantially similar to the first half connectors.

In one or more embodiments, the quick release clamp can also include a first gusset assembly. The first gusset assembly can be connected to a portion of the first half clamp body.

The first gusset assembly can include a first receiver. The first receiver can have a first receiver gusset side and a first receiver non-gusset side opposite the first receiver gusset side. As such, the first receiver gusset side and the first receiver non-gusset side can form a first receiver opening. The first receiver opening can be configured to receive a first support bar from a second piece of equipment. The first gusset assembly can also include one or more gussets.

In one or more embodiments, the first gusset assembly can include a first solid lower gusset and a first solid upper gusset. The first solid lower gusset can be positioned in parallel with a first solid upper gusset. The first solid lower gusset and the first solid upper gusset can be connected to the gusset side of the first receiver. And the first solid lower gusset and the first solid upper gusset can contact the outer side of the first half clamp body.

The first gusset assembly can further include a first non-gusset side pin hole disposed in the first receiver non-gusset side, and a first gusset side pin hole disposed in the first receiver gusset side. The first non-gusset side pin hole and the first gusset side pin hole can be aligned with one another. Accordingly, a pin can be inserted through the pin holes to hold the first support bar in place. The pin can be a threaded fastener, a solid shaft, a hollow shaft, a cotter pin, a mechanical fastener, the like, or combinations thereof.

In one or more embodiments, the quick release clamp can also include a second gusset assembly. The second gusset assembly can be connected to a portion of the second half clamp body.

The second gusset assembly can include a second receiver. The second receiver can have a second receiver gusset side and a second receiver non-gusset side opposite the second receiver gusset side. As such, the second receiver gusset side and the second receiver non-gusset side can form a second receiver opening. The second receiver opening can be configured to receive a second support bar from a piece of equipment. The second gusset assembly can also include one or more gussets.

In one or more embodiments, the second gusset assembly can include a second solid lower gusset positioned in parallel with a second solid upper gusset. The second solid lower gusset and the second solid upper gusset can be connected to the gusset side of the second receiver. And the second solid lower gusset and the second solid upper gusset can contact the outer side of the second half clamp body.

The second gusset assembly can further include a second non-gusset side pin hole disposed in the second receiver non-gusset side, and a second gusset side pin hole disposed in the second receiver gusset side. The second non-gusset side pin hole and the second gusset side pin hole can be aligned with one another. Accordingly, a pin can be inserted through the pin holes to hold the second support bar in place.

The solid upper gussets and the solid lower gussets can form flush engagements with the arcs of the clamp bodies. The support bars can have any shape, such as square or circular.

In one or more embodiments, a first connector can be disposed on the outer side of the first arc. Illustrative connectors can include pad eyes, clips, carabineers, threaded holes, or the like. In addition, a second connector can be disposed on the outer side of the second arc. The second connector can be substantially similar to the first connector.

In one or more embodiments, one or more flange clamps or quick release clamps described herein can be incorporated into a system for supporting a work platform.

An illustrative system can include a first piece of equipment that has a flange Illustrative first piece of equipment can include wellheads, flanges, pipelines, blow out preventers, also know as "BOPs", or combinations thereof. The quick release clamp can be disposed about the flange. And a second piece of equipment, such as, work platforms, wellhead shelters, cranes, iron supports, the like, or combinations thereof, can be connected to the quick release clamp. Accordingly, the quick release clamp can safely support the second piece of equipment.

Figure 2:
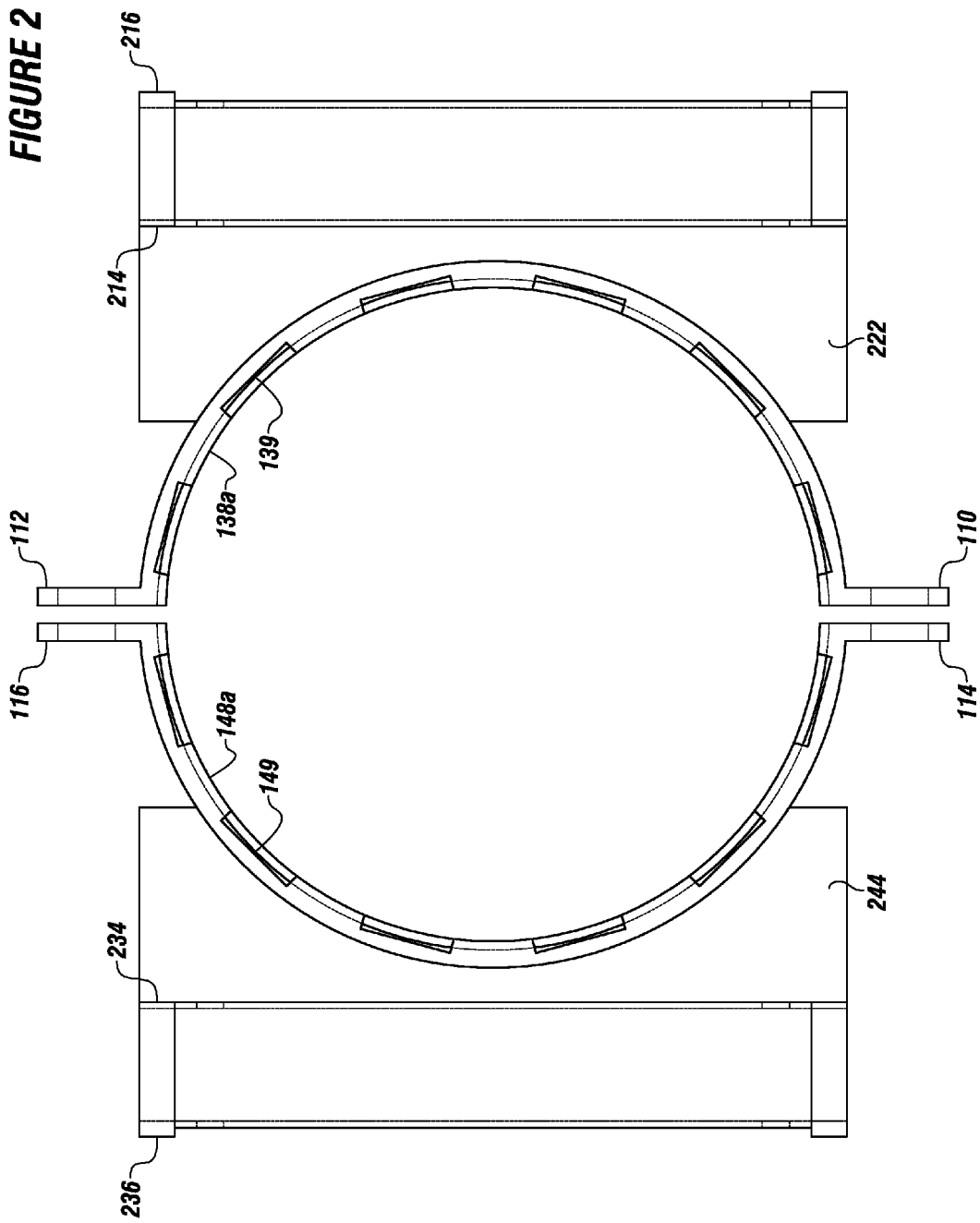
FIG. 2 depicts a top view of the illustrative flange clamp or a quick release clamp of FIG. 1.

Turning now to FIGS. 1 and 2, FIG. 1 depicts an isometric view of an illustrative clamp, which can be a flange or a quick release clamp according to one or more embodiments, and FIG. 2 depicts a top view of the illustrative clamp of FIG. 1.

The clamp 100 can include first half clamp body 130, a second half clamp body 140, a first receiver 212, and a second receiver 232.

The first half clamp body 130 can include a first arc 132. The first arc 132 can have a curvature of about 175 degrees to about 350 degrees.

A first arc first load bearing shoulder 138a can be formed on the first arc inner side.

The first arc first load bearing shoulder 138a can protrude from the first arc inner side away from the first arc outer side by about one-sixteenth of an inch to about thirty inches. The first arc first load bearing shoulder 138a can be configured to support a load of about one pound to about ten-thousand pounds. The first arc first load bearing shoulder 138a can be disposed above a first arc second load bearing shoulder 138b. The first arc second load bearing shoulder 138b can be substantially similar to the first arc first load bearing shoulder 138a. The first arc load bearing shoulders 138a and 138b can be disposed on the first arc inner side by machining, casting, welding, mechanical fasteners, or the like.

A first space 137 adapted to fit about a flange is formed between the first arc load bearing shoulders.

One or more first cutouts 139 can be disposed on at least a portion of at least one of the first arc load bearing shoulders, for example, the first cutouts 139 can be disposed on the first arc first load bearing shoulder 138a. The first cutouts 139 can be configured to allow full range of movement for a nut and a tool tightening the nut onto a fastener disposed through the flange. The first cutouts 139 can have any shape such as elliptical, square, circular, or the like.

A first half first connector 110 can be disposed on one end of the first arc 132. The first half first connector 110 can be formed on or connected to one end of the first arc 132. The first half first connector 110 can have a hole formed therethrough adapted to receive a mechanical fastener.

A first half second connector 112 can be disposed on the other end of the first arc 132 opposite the first half first connector 110. The first half second connector 112 can be substantially similar to the first half first connector 110.

The second half clamp body 140 can include a second arc 142. The second arc 142 can be substantial similar to the first arc 132. As such, the second arc inner side can have a second arc first load bearing shoulder 148a and a second arc second load bearing shoulder 148b disposed thereon. The second arc load bearing shoulders 148a and 148b can be substantially similar to the first arc load bearing shoulder 138a and 138b.

A second space 147 adapted to fit about a flange is formed between the second arc load bearing shoulders 148a and 148b. In addition, one or more second cutouts 149 can be disposed on at least a portion of at least one of the second arc load bearing shoulders 148a and 148b. The second cutouts can be substantial similar to the first cutouts 139.

The second half clamp body 140 can also include a second half first connector 114 disposed on one end of the second arc 142, and a second half second connector 116 disposed on the other end of the second arc 142 opposite the second half first connector 114. The second half connectors 114 and 116 can be substantially similar to the first half connectors 110 and 112.

A first gusset assembly 210 can be connected to a portion of the first half clamp body 130. The first gusset assembly 210 can include a first receiver 212, a first solid lower gusset 220, and a first solid upper gusset 222.

The first receiver 212 can have a first receiver gusset side 214. The first receiver gusset side 214 can be connected to the first solid lower gusset 220 and the first solid upper gusset 222. For example, the first receiver gusset side 214 can be welded or otherwise connected to the first solid lower gusset 220 and the first solid upper gusset 222.

A first receiver non-gusset side 216 can be connected to and parallel to the first receiver gusset side 214. Accordingly, a first receiver opening 215 can be formed. The first receiver opening 215 can be configured to receive a tubular member or bar. The first receiver opening 215 can have a varying width allowing for smooth insertion of the bar or tubular member into the first receiver opening 215.

The first solid lower gusset 220 can be disposed on the first arc 132 outer side and positioned in parallel with the first solid upper gusset 222. The first solid upper gusset 222 and the first solid lower gusset 220 can be welded to or otherwise connected to the first arc outer side. In one or more embodiments, the gusset assembly can include a single gusset.

A second gusset assembly 230 can be connected to a portion of the second half clamp body 230. For example, the second gusset assembly 230 can be welded or otherwise connected to the second arc outer side.

The second gusset assembly 230 can include a second receiver 232. The second receiver 232 can have a second receiver gusset side 234 and a second receiver non-gusset side 236. The second receiver gusset side 234 can be connected to a second solid lower gusset 240 and a second solid upper gusset 244. For example, the second receiver gusset side 234 can be welded or otherwise connected to the second solid lower gusset 240 and the second solid upper gusset 244. The second receiver non-gusset side 236 can be parallel to and connected to the second receiver gusset side 234. As such, a second receiver opening 235 can be formed between the second receiver non-gusset side 236 and the second receiver gusset side 234. The second receiver opening 235 can be configured to receive a tubular member or bar. The second receiver opening 235 can have a varying width allowing for smooth insertion of the bar or tubular member into the second receiver opening 235.

The second solid lower gusset 240 and the second solid upper gusset 244 can be connected to the second arc 142 outer side. For example, the second solid lower gusset 240 and the second solid upper gusset 244 can be welded or otherwise connected to the second arc outer side.

One or more first non-gusset side pin holes 300 can be disposed in the first receiver non-gusset side 216, and one or more first gusset side pin holes, not shown in the Figures, can be disposed in the first receiver gusset side 214. First gusset side pin holes can be substantially similar to second gusset side pin holes 330. The first non-gusset side pin holes 300 can be aligned with the first gusset side pin holes. As such, a pin or other fastener can be disposed through the first gusset side pin holes and the first non-gusset side pin holes 300 to secure a tubular member or bar within the first receiver opening 215.

One or more second non-gusset side pin holes 320 can be disposed in the second receiver non-gusset side 236, and one or more second gusset side pin holes 330 can be disposed in the second receiver gusset side 234. The second non-gusset side pin holes 320 and the second gusset side pin holes 330 can be aligned with one another. As such, a pin or other fastener can be disposed through the pin holes 320 and 330 to secure a tubular member or bar within the second receiver opening 235.

Figure 3:
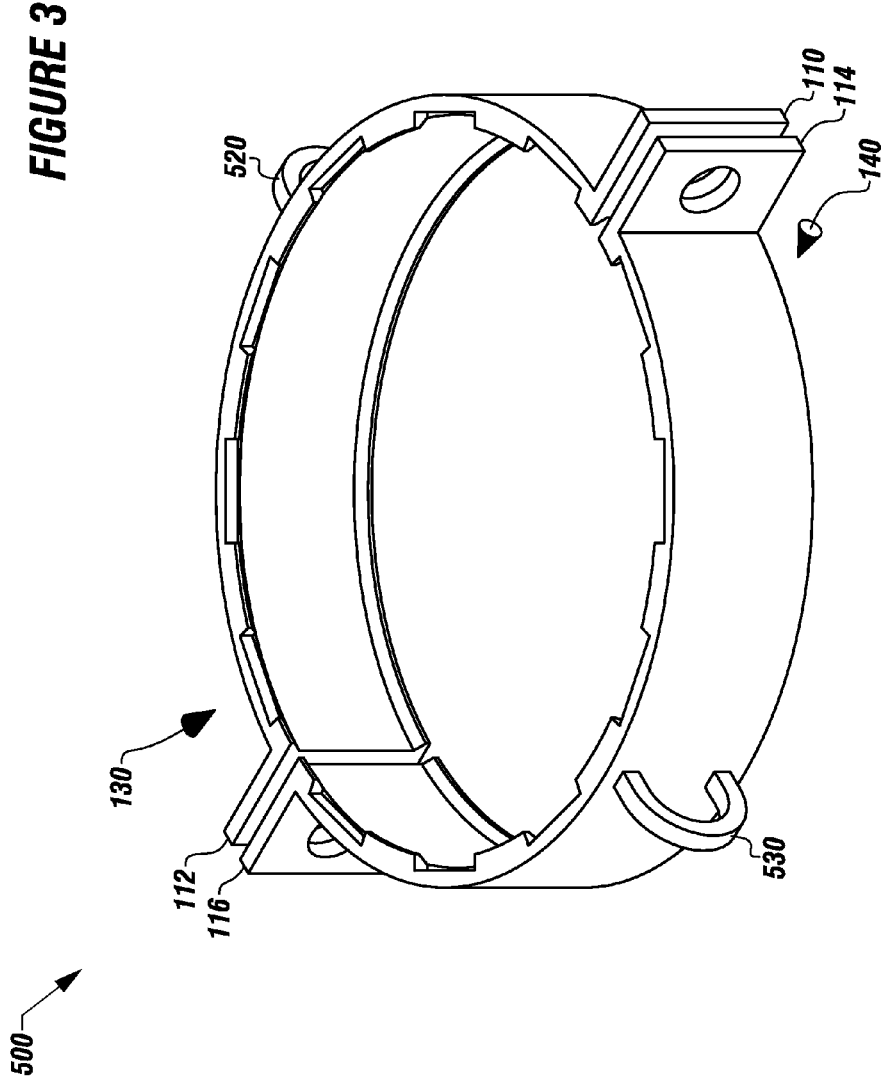
FIG. 3 depicts an isometric view of another illustrative embodiment of a flange clamp or a quick release clamp according to one or more embodiments.

FIG. 3 depicts an isometric view of another illustrative embodiment of a clamp, which can be a flange clamp or a quick release clamp according to one or more embodiments. The clamp 500 can include the first half clamp body 130, the second half clamp body 140, one or more first connectors 520, and one or more second connector 530, the first half first connector 110, first half second connector 112, the second half first connector 114, and the second half second connector 116.

The one or more first connectors 520 can be connected to the first half clamp body 130. The one or more first connectors 520 can be shackles, carabineers, or other fasteners.

The one or more second connectors 530 can be connected to the second half clamp body 140. The one or more second connectors 530 can be shackles, carabineers, or other fasteners.

Figure 4:
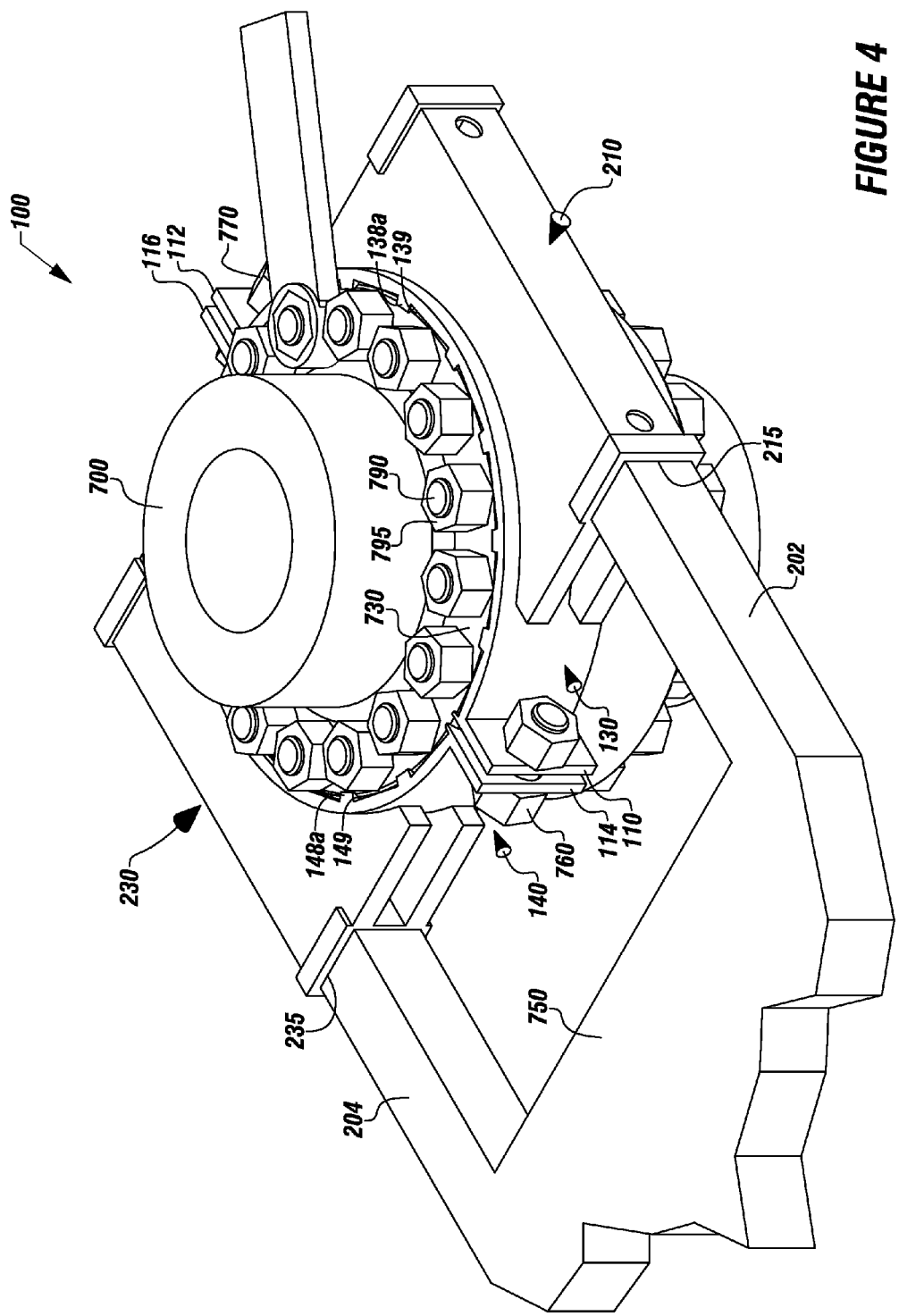
FIG. 4 depicts an isometric view of an illustrative system for supporting a work platform according to one or more embodiments.

FIG. 4 depicts an isometric view of an illustrative system for supporting a work platform according to one or more embodiments.

The system can include the clamp 100, which can be a flange clamp or a quick release clamp, disposed about a first piece of equipment 700 having a flange 730. The first piece of equipment 700 can be oilfield equipment, a wellhead, a pipeline, a tubular member, a blow out preventer, also known as a "BOP", or the like.

The first half clamp body 130 can be disposed about a first half of the flange 730, and the second half clamp body 140 can be disposed about another half of the flange 730. The first half clamp body 130 can be secured to the second half clamp body 140 by a first fastener 760 disposed through the first half first connector 110 and the second half first connector 114, and a second fastener 770 disposed through the first half second connector 112 and the second half second connector 116.

The plurality of flange connectors 790 can be disposed through the flange 730. The flange connectors 790 can have nuts 795. The nuts 795 are free to turn without interference from the first arc first load bearing shoulders 138a and the second arc first load bearing shoulders 148a because of first cutouts 139 and second cutouts 149.

A first support bar 202 can be disposed within the first receiver opening 215 of the first gusset assembly 210, and a second support bar 204 can be disposed within the second receiver opening 235 of the second gusset assembly 230. The support bars 202 and 204 can be connected to a second piece of equipment 750. The second piece of equipment can be a crane, an iron support, a wellhead shelter, the like, or combinations thereof.

While these embodiments have been described with emphasis on the embodiments, it should be understood that within the scope of the appended claims, the embodiments might be practiced other than as specifically described herein.

What is claimed is:

1. A quick release clamp comprising:
 a. a first half clamp body comprising;
  (i) a first arc with a first arc outer side and a first arc inner side, wherein the first arc inner side has a first arc first load bearing shoulder and a first arc second load bearing shoulder, wherein a first space adapted to fit about a flange is formed between the first arc load bearing shoulders, and wherein a first cutout is disposed on at least a portion of at least one of the first arc load bearing shoulders;
  (ii) a first half first connector disposed on one end of the first arc;
  (iii) a first half second connector disposed on the other end of the first arc opposite the first half first connector; and
 b. a second half clamp body comprises:
  (i) a second arc with a second arc outer side and a second arc inner side, wherein the second arc inner side has a second arc first load bearing shoulder and a second arc second load bearing shoulder, wherein a second space adapted to fit about the flange is formed between the second arc load bearing shoulders, and wherein a second cutout is disposed on at least a portion of at least one of the second arc load bearing shoulders;
  (ii) a second half first connector disposed on one end of the second arc; and
  (iii) a second half second connector disposed on the other end of the second arc opposite the second half first connector; and
 wherein the quick release clamp comprises at least one gusset disposed on the first half clamp body, the second half clamp body, or combinations thereof.

2. The quick release clamp of claim 1, further comprising a first gusset assembly connected to a portion of the first half clamp body, wherein the first gusset assembly comprises:
 a. a first receiver having a first receiver gusset side and a first receiver non-gusset side opposite the first receiver gusset side and forming a first receiver opening configured to receive a first support bar; and
 b. a first solid lower gusset positioned in parallel with a first solid upper gusset wherein the first solid lower gusset and the first solid upper gusset are connected to the first receiver gusset side of the first receiver; and wherein the first solid lower gusset and the first solid upper gusset contact an outer side of the first half clamp body.

3. The quick release clamp of claim 2, further comprising a second gusset assembly connected to a portion of the second half clamp body, wherein the second gusset assembly comprises:
   a. a second receiver having a second receiver gusset side and a second receiver non-gusset side opposite the second receiver gusset side and forming a second receiver opening configured to receive a second support bar; and
   b. a second solid lower gusset positioned in parallel with a second solid upper gusset, wherein the second solid lower gusset and second solid upper gusset are connected to the second receiver gusset side of the second receiver, and wherein the second solid lower gusset and the second solid upper gusset contact an outer side of the second half clamp body.

4. The quick release clamp of claim 3, wherein the solid upper gussets and the solid lower gussets form flush engagements with the arcs of the clamp bodies.

5. The quick release clamp of claim 3, wherein the support bars are square.

6. The quick release clamp of claim 3, further comprising a first non-gusset side pin hole disposed in the first receiver non-gusset side, and a first gusset side pin hole disposed in the first receiver gusset side, wherein the first non-gusset side pin hole and the first gusset side pin hole are aligned with one another.

7. The quick release clamp of claim 6, further comprising a second non-gusset side pin hole disposed in the second receiver non-gusset side, and a second gusset side pin hole disposed in the second receiver gusset side, wherein the first non-gusset side pin hole and the first gusset side pin hole are aligned with one another.

8. The quick release clamp of claim 1, wherein the first arc and the second arc each form at least a 175 degree curve.

9. The quick release clamp of claim 1, wherein a first connector is disposed on the first arc outer side.

10. The quick release clamp of claim 9, wherein a second connector is disposed on the second arc outer side.

11. A system for supporting a work platform, the system comprising:
   a. a first piece of equipment comprising a flange;
   b. a quick release clamp, disposed about the flange, wherein the quick release clamp comprises:
      (i) a first half clamp body comprising;
         1. a first arc with an outer side and an inner side, wherein the inner side has a first load bearing shoulder and a second load bearing shoulder, wherein a first space adapted to fit about the flange is formed between the load bearing shoulders, and wherein a first cutout is disposed on at least a portion of at least one of the load bearing shoulders;
         2. a first half first connector disposed on one end of the first arc;
         3. a first half second connector disposed on the other end of the first arc opposite the first half first connector; and
      (ii) a second half clamp body comprising:
         1. a second arc with an outer side and an inner side, wherein the inner side has a first load bearing shoulder and a second load bearing shoulder, wherein a second space adapted to fit about the flange is formed between the load bearing shoulders, and wherein a second cutout is disposed on at least a portion of at least one of the load bearing shoulders;
         2. a second half first connector dispose on one end of the second arc; and
         3. a second half second connector disposed on the other end of the second arc opposite the second half first connector; and
   c. a second piece of equipment connected to the quick release clamp.

12. The system of claim 11, wherein the quick release clamp further comprises a first gusset assembly connected to a portion of the first half clamp body, wherein the first gusset assembly comprises:
   a. a first receiver having a first receiver gusset side and a first receiver non-gusset side opposite the first receiver gusset side and forming a first receiver opening configured to receive a first support bar from the second piece of equipment; and
   b. a first solid lower gusset positioned in parallel with a first solid upper gusset wherein the first solid lower gusset and the first solid upper gusset are connected to the first receiver gusset side of the first receiver; and wherein the first solid lower gusset and the first solid upper gusset contact the outer side of the first half clamp body.

13. The system of claim 12, wherein the quick release clamp further comprises a second gusset assembly connected to a portion of the second half clamp body, wherein the second gusset assembly comprises:
   a. a second receiver having a second receiver gusset side and a second receiver non-gusset side opposite the second receiver gusset side and forming a second receiver opening configured to receive a second support bar from the second piece of equipment; and
   b. a second solid lower gusset positioned in parallel with a second solid upper gusset wherein the second solid lower gusset and second solid upper gusset are connected to the second receiver gusset side, and wherein the second solid lower gusset and the second solid upper gusset contact the outer side of the second half clamp body.

14. The system of claim 13, wherein the solid upper gussets and the solid lower gussets form flush engagements with the arcs of the clamp bodies.

15. The system of claim 13, wherein the support bars are hollow.

16. The system of claim 13, further comprising a first non-gusset side pin hole disposed in the first receiver non-gusset side, and a first gusset side pin hole disposed in the first receiver gusset side, wherein the first non-gusset side pin hole and the first gusset side pin hole are aligned with one another.

17. The system of claim 16, further comprising a second non-gusset side pin hole disposed in the second non-gusset side, and a second gusset side pin hole disposed in the second receiver gusset side, wherein the second non-gusset side pin hole and the second gusset side pin hole are aligned with one another.

18. The system of claim 11, wherein the first arc and the second arc each form at least a degree curve.

\* \* \* \* \*